Figure 10:
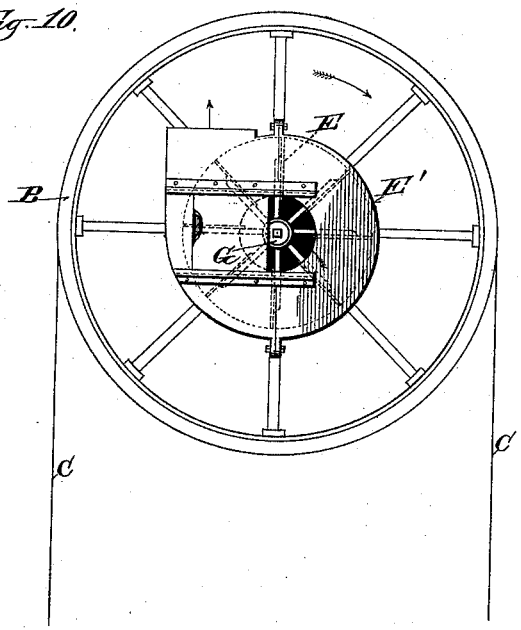

(No Model.) 3 Sheets—Sheet 1.
W. GOWEN.
BAND SAW MILL.
No. 383,458. Patented May 29, 1888.
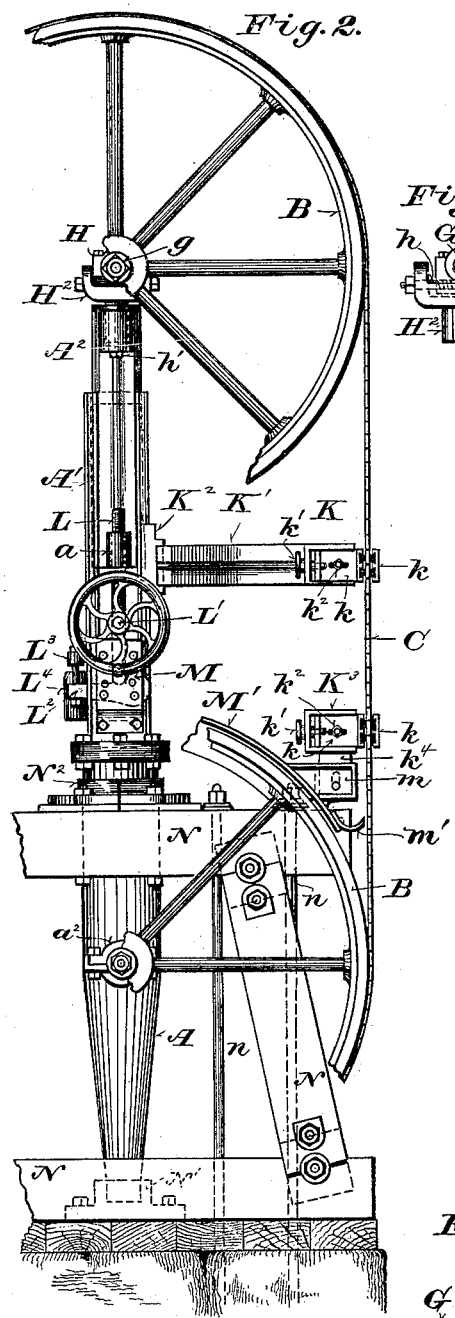
Fig. 2.
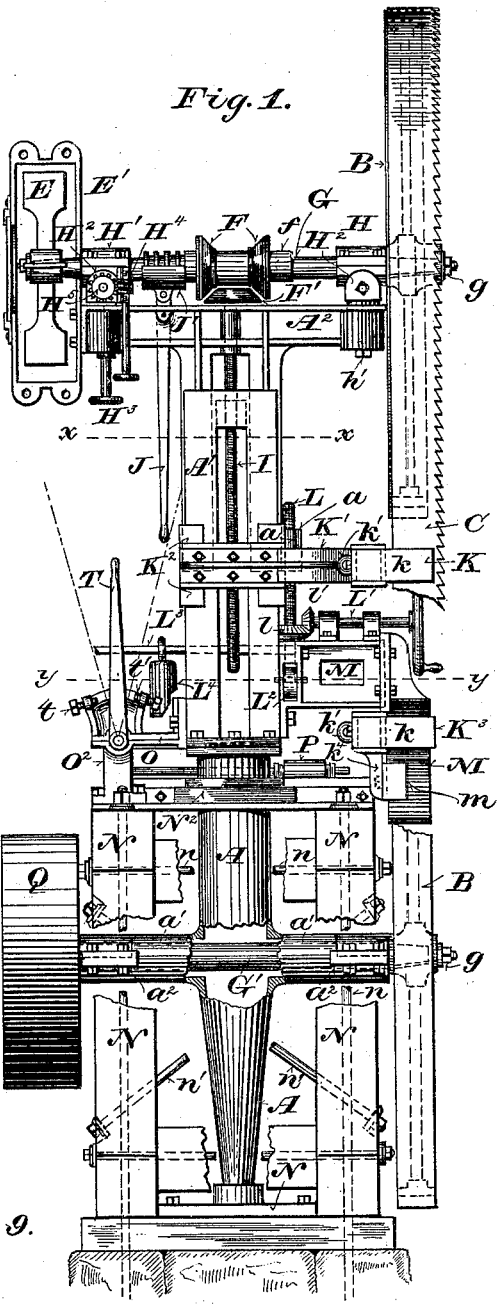
Fig. 1.
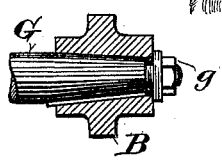
Fig. 9.
WITNESSES:
Chas. L. Goss.
August Lindmann.
INVENTOR,
William Gowen,
BY 
ATTORNEY.

(No Model.) 3 Sheets—Sheet 2.
W. GOWEN.
BAND SAW MILL.
No. 383,458. Patented May 29, 1888.
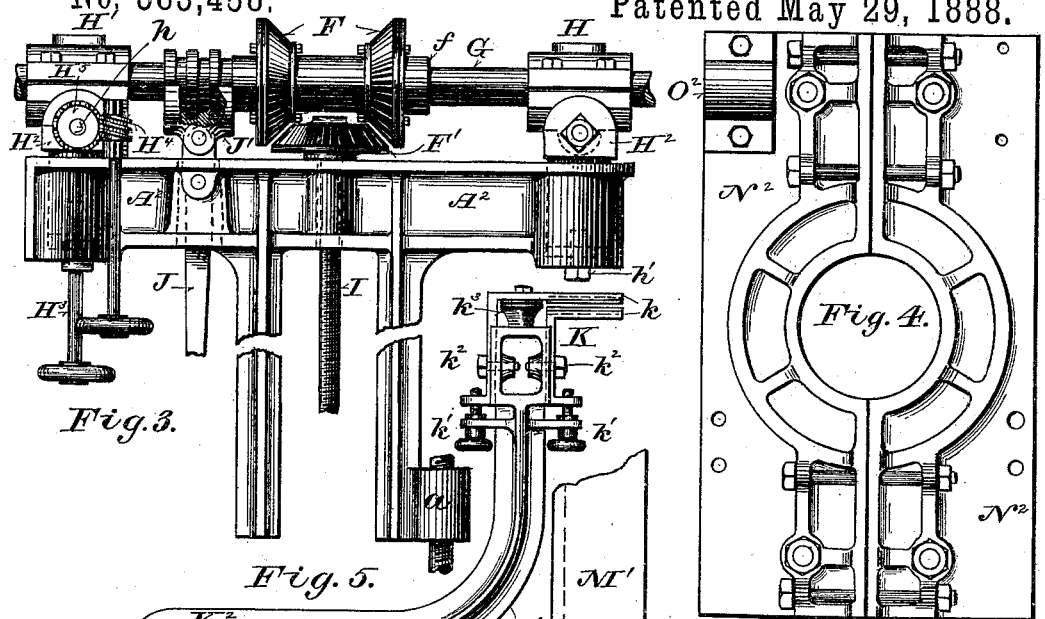
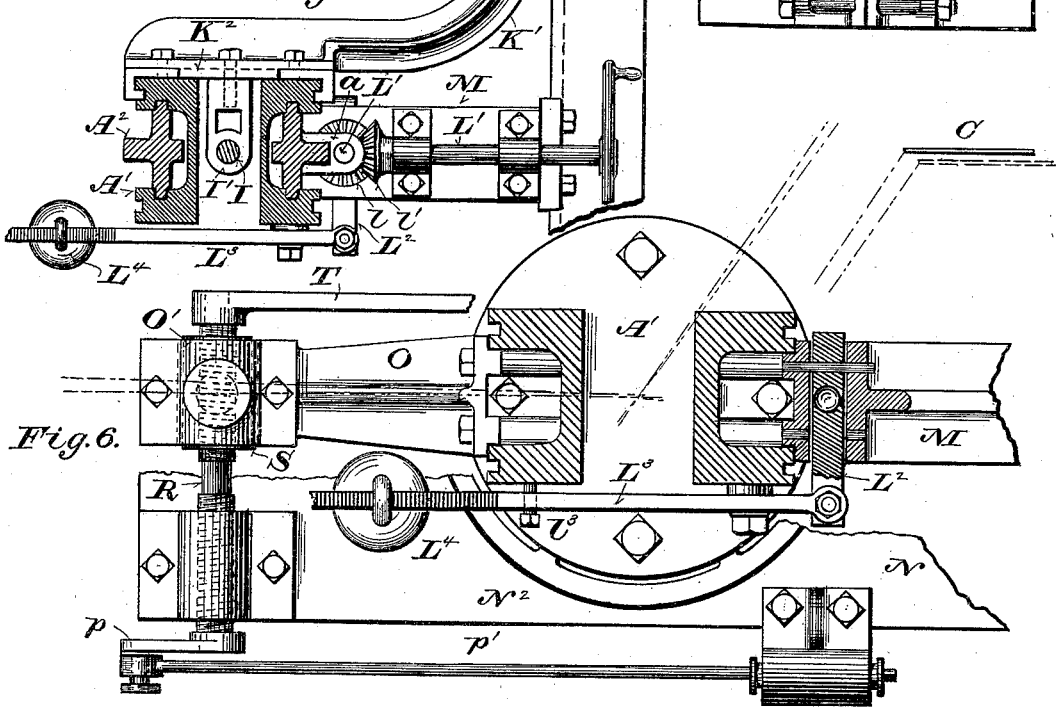
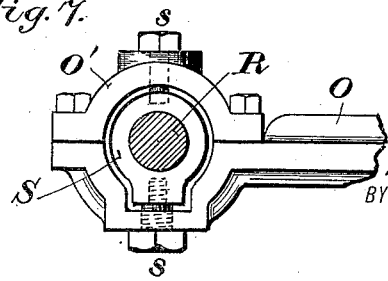
WITNESSES:
Chas. L. Goss.
August Lindemann.
INVENTOR,
William Gowen,
BY
ATTORNEY.

(No Model.)   3 Sheets—Sheet 3.

W. GOWEN.
BAND SAW MILL.

No. 383,458.   Patented May 29, 1888.

Witnesses:
E. J. Asmus
Chas. L. Goss,

Inventor:
William Gowen,
By C. H. Bottum
Attorney.

UNITED STATES PATENT OFFICE.

WILLIAM GOWEN, OF WAUSAU, WISCONSIN.

BAND-SAW MILL.

SPECIFICATION forming part of Letters Patent No. 383,458, dated May 29, 1888.

Application filed December 20, 1886. Serial No. 222,024. (No model.)

*To all whom it may concern:*

Be it known that I, WILLIAM GOWEN, of Wausau, in the county of Marathon and State of Wisconsin, have invented certain new and useful Improvements in Band-Saw Mills; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are, first, to adapt the parts of which the machine is composed to right and left mills; second, to prevent the overrunning of the upper band-wheel, and thereby maintain the tension of the saw between said wheel and the cut made by said saw; third, to prevent contact between the saw and log in "gigging;" fourth, to "trim" the upper band-wheel; fifth, to adjust the lead of the saw; sixth, to ascertain and properly adjust and maintain the tension of the saw; seventh, to positively hold the saw to the true line of its work; eighth, to raise and lower the upper guide according to the size or thickness of the log or timber to be sawed; ninth, to maintain the band-wheels and other parts of the machine in their proper relative positions when once adjusted, and, tenth, to facilitate the manufacture and shipment of the machine.

It consists, essentially, of a supporting standard or column carrying the various essential working parts of the machine, which are arranged to swing together with said supporting-column about a common axis, of a fan mounted upon the upper band-wheel shaft, of a frame furnished with bearings for said upper band-wheel shaft, a vertically and horizontally adjustable bearing for said upper band-wheel shaft, a reversible guide adapted to ways provided therefor on either side of said column, means for raising and lowering the frame which carries the upper band-wheel, a counter-balance for determining and adjusting the tension of the saw, mechanism for swinging the supporting-column with its attachments upon its axis, and an adjustable stop for regulating the lead of the saw, and of other features hereinafter specifically set forth.

In the accompanying drawings like letters designate the same parts in the several figures.

Figure 1 is a side elevation of my improved machine, the fan-case being shown in vertical section and portions of the frame-work, &c., of the machine being broken away to disclose other essential parts. Fig. 2 is a front elevation of the same, the upper band-wheel being removed and portions of the frame-work, band-wheels, &c., being broken away. Fig. 3 is a detached side elevation, on an enlarged scale, of the T-frame with the upper band-wheel shaft and mechanism for raising and lowering the upper guide. Fig. 4 is a plan view, on an enlarged scale, of the box in which the supporting-column is supported and turns. Fig. 5 is a horizontal section of the supporting-column on the line $x$ $x$, Fig. 1, showing a plan view of the upper saw-guide and saw-straining device. Fig. 6 is a like section of the supporting-column and saw-straining device on the line $y$ $y$, Fig. 1, showing in plan view the offsetting mechanism by which said column, with its attachments, is swung. Fig. 7 is a side elevation of the pivoted screw-box by which the supporting-column is operated. Fig. 8 is an elevation, taken at right angles to Fig. 1, of the box supporting the upper band-wheel shaft farthest from the band-wheel. Fig. 9 is a detail view showing the construction of the ends of the band-wheel shafts, and Fig. 10 is a side elevation of the fan and case at the rear end of the upper band-wheel shaft.

In the drawings, Fig. 1 represents the machine arranged for a left-hand mill, or one in which the carriage travels on the left-hand side of a person facing the cutting-edge of the saw; and Figs. 2, 5, and 6 represent the machine as arranged for a right-hand mill.

Referring to Figs. 1 and 2, A A' represent an upright supporting standard or column, preferably cast, to facilitate its manufacture and shipment, in two sections, which are permanently secured together by means of bolts and coupling-flanges when the mill is set up. The lower section, A, is made cruciform, and the horizontal limb $a'$, through which the lower band-wheel shaft passes, is furnished at its ends with boxes $a^2$ $a^2$ therefor, while the vertical limb is supported and arranged to turn at its lower reduced end in the step N' and at or near its upper cylindrical end in the box N², which is divided centrally and vertically into two sections, as shown in Fig. 4, and is supported upon and permanently secured to the frame N. The frame N is preferably made of timbers secured together and braced by tie-bolts and truss-rods n n', as shown in Figs. 1 and 2, and supported together with the step N' upon a foundation of masonry, to which they are securely anchored. A tenon formed at the upper end of section A is fitted into a mortise in the lower end of section A' of the supporting-column, as seen in Figs. 1 and 2, to insure against the displacement of said upper section.

At the upper end of section A' of the supporting-column is mounted the vertically-adjustable T-frame A², which is provided with tongued guides working in grooved ways formed therefor in said section A', as seen most clearly in Fig. 5.

In vertical sockets formed therefor at each end of said T-frame are journaled the box-supporting trunnions H² H², formed at their upper ends with bifurcated heads, in which the lower segments of the boxes H H', supporting the upper band-wheel shaft, G, are hinged, so as to swing toward or from the upper band-wheel, as shown in Figs. 1, 2, and 3. The trunnion H², adjacent to the upper band-wheel, is permanently secured in its socket in the T-frame A² by the bolt h', while the trunnion H² at the opposite end of said shaft G is made vertically adjustable by means of the hand-screw H³, swiveled in said T-frame and threaded into a vertical socket in said trunnion.

The box H' is hinged by its lower segment upon a screw, h, journaled at its ends in the head of the supporting-trunnion H², and is capable of a horizontal adjustment at right angles to shaft G between the ears on the head of said trunnion, constituting the bearings for said screw h, as shown in Fig. 8. The screw h is provided at one end, outside of the head of trunnion H², with a worm-gear, H⁵, working with a worm, H⁴, on a vertical shaft journaled in bearings formed therefor on the head of trunnion H². The depending end of said worm-shaft is furnished with a head or hand wheel, by means of which the screw h may be operated, and the box H' moved laterally across the T-frame in either direction.

G G' are the band-wheel shafts, preferably formed with similar tapering feathered ends, as shown in Fig. 9, for the attachment of the band-wheels B B, fan E, and driving-pulley Q, which have similar conical or tapering openings with feather-seats in their hubs. The fan E is mounted upon the end of the shaft G opposite the upper band-wheel B and is inclosed by a case, E'. Although the primary object of the fan is to prevent the overrunning of the upper band-wheel and the resulting slack in the saw C when the speed of the lower band-wheel is suddenly retarded, said fan-case E' may be connected with spouts or conduits and the fan utilized for catching up and conducting to any desired place of deposit the dust produced by the saw. The induction-opening of said fan-case is provided with a slide or valve, as shown in Figs. 1 and 10, to regulate the admission of air into said case, and the case is made spiral or of increasing radius toward its eduction-opening. By thus securing the fan directly to the shaft of the upper band-wheel and inclosing an air-chamber about it its action is rendered constant, elastic, and immediate when occasion requires, thus preventing the overrunning of the upper band-wheel when the rotation of the lower band-wheel is suddenly retarded, the elasticity of the air preventing an injurious jar or shock to the machine.

Upon the end of the shaft G' opposite the lower band-wheel B is mounted the driving-pulley Q. The band-wheels B B, fan E, and driving-pulley Q are all secured in place upon the shafts G G' by means of retaining-nuts and washers g g.

To the side of section A' of the supporting-column nearest to the saw C is bolted a bracket, M, transversely recessed adjacent to said section A' to receive the lever L², which is fulcrumed at one end upon a cross-pin secured in said bracket and connected at the other end with the short arm of lever L³, fulcrumed at right angles thereto to the side of the supporting-column. Upon the longer arm of said lever L³ is hung a weight, L⁴, the function of which will be hereinafter explained. The lever L³ is prevented from swinging below the desired limit by a stop, l³, on the supporting-column.

L is a screw-shaft bearing at its lower end in a depression or socket formed therefor in the upper face of the lever L², near its fulcrum, and engaging with an internally-threaded ear or sleeve, a, formed on or secured to the base of the T-frame A², as shown in Figs. 1, 2, and 3.

L' is a shaft mounted in bearings provided therefor on the upper side of the bracket M, and furnished at its front end between the band-wheels B B and sides of the saw C with a crank and at the opposite end with a bevel-gear, l', which works with a larger gear, l, fixed on the screw-shaft L, by means of which the T-frame A² may be raised or lowered by the operator standing in front of the machine facing the saw.

K K³ are saw-guides, each composed of two metallic plates, k k, bent at right angles and adjustably secured to opposite faces of the guide-block or support by means of bolts k² k², as seen in Figs. 2 and 5, and supported by lips or flanges formed upon said guide-block or support and bearing against the upper and lower edges of the contiguous limbs of said guide-plates. By means of screws k' k', swiveled in ears formed on the guide-blocks or supports and threaded into ears formed on the guide-plates k k, the latter may be each moved independently toward or from the saw C.

The inner faces of the guide-plates are formed with horizontal dovetailed grooves adjacent to the faces of the saw, and into these grooves are driven dovetailed blocks of wood or other suitable material, which, when the guides are properly set and the plates $k\ k$ properly adjusted, bear lightly against the faces of the saw C on opposite sides thereof. Each guide is also furnished between the plates $k\ k$ with a grooved roller, $k^3$, which turns on a spindle secured in the end of the guide-block or support, as shown in Fig. 5. The upper guide-block or support is formed upon or attached to the end of an L-shaped arm, K', which in turn is secured to a slide having tongued guides working in vertical grooves formed therefor in section A' of the central supporting-column.

By forming similar grooves in the opposite sides of the supporting-column, and a central vertical slot to receive the nut I' from either side of said column, the guide K is made reversible, and thus adapted to either a right or left mill. To raise or lower the upper guide, K, to suit logs of different sizes, I provide a screw-shaft, I, centrally journaled at its upper end in the T-frame $A^2$ in a vertical position, and working with the nut I', formed upon or attached to the slide $K^2$, as shown in Fig. 5.

Upon the upper band-wheel shaft, G, is placed the sleeve $f$, which is prevented from turning thereon by a feather on said shaft, and upon this sleeve are secured two friction-wheels, F F, arranged to work with a similar friction-wheel, F', on the upper end of the screw-shaft I and to turn said screw-shaft in either direction. The sleeve $f$ is extended at one end and formed with circumferential ribs and grooves working with a similarly ribbed and grooved half-box, J', which is hinged to the upper end of a lever, J, fulcrumed in and depending from the T-frame $A^2$. When the lever J hangs in a normal or vertical position, both friction-wheels F F clear the friction-wheel F', but when it is swung to either side one of said wheels F F is brought into engagement with the wheel F', and the screw I turned to the right or left, as the case may be.

The lower guide, $K^3$, is like the upper guide, K, just described, except that the guide-block or support is formed on the under side with a vertically-slotted attachment-plate, $k^4$, by means of which it is bolted to a projection, $m$, from the housing M' of the lower band-wheel and capable of slight vertical adjustment. The plate $k^4$ is supported at its edges by vertical ribs formed on the projection $m$, as shown most clearly in Fig. 1. The housing M' has at its opposite side (not shown) a duplicate of the projection $m$, whereby the lower guide may be used for either right or left mills, and it is secured to the bracket M, which carries a part of the saw-straining mechanism, as shown most clearly in Fig. 1. $m'$ is a scraper adjustably attached to the housing M' and arranged to remove dust from the inner face of the saw.

To the back or side of the supporting-column, opposite the saw C, is secured, a little above the box $N^2$, an arm, O, having at its outer end a sleeve or box, O', in which is pivoted on a vertical axis the internally-threaded box or nut S by means of pivot-bolts $s\ s$, as shown in Fig. 7.

$O^2$ is an internally-screw-threaded box secured to the base of box $N^2$, and R is a shaft having right and left screws, one of which works in the box R and the other in the nut S, pivoted in the terminal sleeve or box of the arm O, as shown in Fig. 6. To the end of the screw-shaft R nearest to the log-carriage is secured the lever T, the arc of vibration of which is adjusted by means of the stop-bolts $t\ t'$ to limit, as required, the angular movement of the supporting-column and the lateral movement of the saw, which are indicated by dotted radii in Fig. 6.

An engine, P, mounted upon the base of the box $N^2$, and connected by its piston-rod $p'$ with a crank, $p$, on the screw-shaft R, as shown in Figs. 1 and 6, may be employed to swing the supporting-column and shift the saw C away from the log in gigging.

The operation of my improved band-mill may be described as follows: The upper band-wheel is first trained to run in the same plane with the lower band-wheel by the adjustment of its shaft G, which should be set exactly parallel with the shaft G' by means of the screws $h$ and $H^3$. When this adjustment has once been properly made, the screw $h$ should not be disturbed, except to maintain the parallelism of the shaft G with the shaft G'. After the foregoing adjustment has been made, the box H may be vertically adjusted, by means of the screw $H^3$, to cause the saw C to run true upon the band-wheels B B. This sometimes becomes necessary when the saw is changed, owing to differences in the tension of different saws. The T-frame $A^2$ is then adjusted, by means of the screw-shaft L and crank shaft L', to strain the saw as desired, the degree of tension being regulated by the size and position of the weight $L^4$ on the lever $L^3$, which should be brought as nearly as practicable to a horizontal position. When the weight $L^4$ has once been fixed to produce the desired tension, it need not be disturbed in changing saws; but when a new saw is placed on the band-wheels it should be strained by the screw L till the lever $L^3$ is brought to a horizontal position. The guide-plates $k\ k$ are adjusted by means of the screws $k'\ k'$ so as to bring the guide-blocks lightly against the opposite faces of the saw, and thereby maintain said saw in its proper working position—viz., a vertical plane tangent to the face of both band-wheels B B. The stop-bolt $t'$ is adjusted so that when the lever T is swung snugly against it the working-segment of the saw-blade will be in a plane exactly parallel with the line of travel of the log-carriage—a position shown by the full lines representing the saw in Fig. 6. The "lead" of the saw may be changed by the adjustment of the stop-bolt $t'$ to bring it to the true line of its work, if upon trial it is found from any cause to draw away therefrom. The machine being ready for operation, power is applied thereto through the driving-pulley Q, which drives the saw through the lower band-wheel in the proper direction, (according to the relative position of the log-carriage, either to the right or left of the saw.) The upper guide is moved by means of the lever J, controlling the friction-wheels F F, which operate the screw shaft I, to a point as near as practicable to the upper side of the log. When the saw has completed a cut, the lever T is swung back by the operator till it meets the stop $t$, thus swinging the saw away from the log, as shown by dotted lines in Fig. 6, while the carriage is run or gigged back; or, in place of the lever T, the engine P, controlled by a valve (not shown,) which may be worked by the foot or hand of the operator, may be employed to accomplish the same end.

In "ranging" or changing the lead of the saw, as it is usually done, by the adjustment of the upper band-wheel and guides independently of each other and of the lower band-wheel, the saw is twisted, and thereby caused to bind in the guides, to work hard, and to make a winding or crooked cut, resulting in imperfect lumber.

It will be observed that when the band-wheels and their shafts and the guides have been once properly adjusted in my machine to cause the working side of the saw to run in a true plane tangent to the faces of the band-wheels, the saw is ranged and its lead changed without changing the relative position of any of the foregoing parts by swinging the supporting-column upon its axis, thus carrying the saw, with all its connections, toward or away from the carriage, as desired, and causing it to cut in a true plane parallel with the line of travel of said carriage.

It is obvious that the details of construction of my improved device may be variously modified without departure from the spirit of my invention or the principle of its operation.

I claim—

1. In a band saw mill, the combination of a supporting-column arranged to swing about a vertical axis, band-wheels carried by said column, and the band-saw mounted upon said wheels, substantially as and for the purposes set forth.

2. In a band saw mill, the combination of the band-wheels and their connections movable about a common upright axis and mechanism connected with and arranged to swing said band-wheels and their connections simultaneously toward and away from the log carriage way, substantially as and for the purposes set forth.

3. In a band-saw mill, the combination of an upright column supported and arranged to swing about its axis in suitable bearings, band-wheels and their shafts supported by and movable with said column, a screw working in a nut in connection with said column and bearing or engaging with a fixed box, and means for operating said screw, substantially as and for the purposes set forth.

4. In a band-saw mill, an upright supporting-column composed of two sections, the lower section of which is furnished with bearings for the lower band-wheel shaft, in combination with a vertically-adjustable frame mounted upon the upper section and furnished with bearings for the upper band-wheel shaft, all arranged to be swung in suitable bearings about an upright axis, substantially as and for the purposes set forth.

5. In a band-saw mill, the combination of an upright supporting-column bearing at its lower end in a step and at an intermediate point in a box permanently secured to suitable framework, and the band wheels and saw carried by and movable with said column about its axis, substantially as and for the purposes set forth.

6. In a band-saw mill, the combination, with the band wheels and saw, of an upright supporting-column capable of angular movement about an upright axis, a vertically-adjustable frame movable in ways provided therefor on said column and furnished with bearings for the upper band-wheel shaft, and mechanism arranged to raise and lower said frame, substantially as and for the purposes set forth.

7. In a band-saw mill, the combination of the supporting-column, a T-frame having a central upright section movable in upright ways on said column, and a horizontal section both ends of which project beyond said column, boxes attached to the projecting ends of said horizontal section by universal-joint connections, the box opposite the upper band-wheel being vertically and laterally adjustable, and the upper band-wheel shaft bearing in said boxes, substantially as and for the purposes set forth.

8. In a band-saw mill, the combination of the band wheels and saw, an upright supporting standard or column, a vertically-adjustable frame mounted thereon and furnished with bearings for the upper band-wheel shaft, a screw working with a nut on said frame and bearing at the lower end in a step-lever fulcrumed to the supporting-column, a weighted lever connected with the free end of said step-lever and fulcrumed transversely thereto upon said supporting-column, and means for turning said screw, substantially as and for the purposes set forth.

9. In a band saw mill, the combination, with the band wheels and saw, of a fan secured directly upon the upper band-wheel shaft, a case inclosing an air-chamber about said fan and provided with induction and eduction openings, and a regulating valve or slide working in one of said openings, substantially as and for the purposes set forth.

10. In a band-saw mill, the combination, with the band wheels and saw, of an upright supporting-column provided on opposite sides with ways, a reversible and vertically-adjustable guide arm or slide adapted to the ways on either side of said column, a guide attached to said guide-arm or slide, and means for raising and lowering said guide-arm or slide with its guide, substantially as and for the purposes set forth.

11. In a band-saw mill, the combination, with the band wheels and saw, of a guide mounted upon a vertically-adjustable slide, a supporting-column provided with ways for said slide, an upright screw working with a nut on said slide and provided with a friction-wheel, a sleeve feathered on one of the band-wheel shafts and provided with a pair of friction-wheels, either of which works with the friction-wheel on said screw, and a lever connected with and arranged to move said sleeve endwise on said shaft, substantially as and for the purposes set forth.

12. In a band-saw mill, the combination, with the band wheels and saw, of a housing covering the upper portion of the lower band-wheel and provided at each end with a plate or flange for the attachment of a saw-guide, and a right and left guide or guides attachable thereto, substantially as and for the purposes set forth.

13. In a band-saw mill, the combination, with the band wheels and saw, of an upright supporting-column adjustable about its axis, a lever connected with and arranged to turn said column, and an adjustable stop arranged to limit the angular movement of said column, substantially as and for the purposes set forth.

14. In a band-saw mill, the combination, with the band wheels and saw, of an upright supporting-column carrying said wheels and saw, and an engine connected therewith and arranged under the control of the operator to swing said column about its axis, substantially as and for the purposes set forth.

15. In a band-saw mill, the combination, with the band wheels and saw, of an upright supporting-column carrying said band wheels and saw and capable of angular movement about an upright axis, a vertically-adjustable frame carrying the upper band-wheel and movable in ways provided therefor on said column, a screw working with a nut on said frame and provided with a gear, a bracket attached to the front side of said column between the sides of said saw, a step-lever fulcrumed in a recess in said bracket and furnishing a bearing for the lower end of said screw, a weighted lever fulcrumed to the side of said column and connected with the free end of said step-lever, and a crank-shaft mounted on said bracket and provided with a gear working with the gear on said screw, substantially as and for the purposes set forth.

16. In a band-saw mill, the combination, with the band wheels and saw, of an upright supporting-column, a vertically-adjustable frame mounted upon said column, trunnions bearing in vertical sockets formed therefor in said frame, boxes horizontally hinged to the heads of said trunnions and supporting the upper band-wheel shaft, and adjusting-screws arranged to move the box farthest from the upper band-wheel vertically and horizontally, substantially as and for the purposes set forth.

17. In a band-saw mill, the combination, with the band wheels and saw, of a supporting-column provided on opposite sides with vertical ways, a reversible arm provided with a guide and adapted to the ways on either side of said column, and a cross-piece projecting on both sides of said column, and a right and left guide or guides attachable to the opposite ends of said cross-piece, substantially as and for the purposes set forth.

18. In a band-saw mill, the combination, with the band wheels and saw, of a centrally-slotted supporting-column, a vertically-adjustable frame mounted thereon and carrying the upper band-wheel, an upright screw shaft centrally journaled in said frame, a reversible guide-supporting arm adapted to ways on either side of said column and provided with a nut working in either position with said screw-shaft, and means for driving said screw-shaft from said upper band-wheel shaft, substantially as and for the purposes set forth.

In testimony that I claim the foregoing as my own I affix my signature in presence of two witnesses.

WILLIAM GOWEN.

Witnesses:
CHAS. L. GOSS,
M. E. BENSON.